Figure 1:
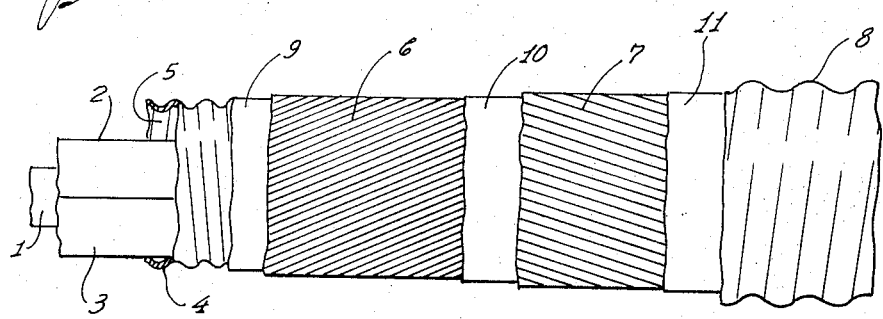

United States Patent
Bittner

[11] 3,831,636
[45] Aug. 27, 1974

[54] ARMORED TUBING WITH HELICAL OR CIRCULAR CORRUGATION

[75] Inventor: Herbert Bittner, Krahenwinkel, Germany

[73] Assignee: Kabel-und Metallwerke Gutehoffnungshutte Aktiengesellschaft, Hannover, Germany

[22] Filed: Dec. 6, 1971

[21] Appl. No.: 204,887

[30] Foreign Application Priority Data
Dec. 28, 1970  Germany............................ 2064053

[52] U.S. Cl............... 138/173, 138/112, 138/114, 138/122, 174/28, 174/108, 174/105 R
[51] Int. Cl............................ F16l 9/04, F16l 9/18
[58] Field of Search............ 138/111, 112, 113, 114, 138/122, 130, 134, 140, 150, 153, 173; 174/105 R, 102 D, 108, 28

[56] References Cited
UNITED STATES PATENTS

| | | | |
|---|---|---|---|
| 1,925,231 | 9/1933 | Bundy | 138/129 X |
| 1,951,723 | 3/1934 | Burd | 174/108 X |
| 2,006,932 | 7/1935 | Rosch | 138/150 X |
| 2,037,350 | 4/1936 | Taliozzi | 138/122 X |
| 2,216,435 | 10/1940 | Eckel | 174/102 D |
| 2,825,364 | 3/1958 | Cullen et al. | 138/130 X |
| 2,867,242 | 1/1959 | Harris | 138/135 X |
| 3,163,836 | 12/1964 | Sergi | 174/108 |
| 3,257,863 | 6/1966 | Hanson | 138/140 X |
| 3,318,337 | 5/1967 | Bauer | 138/130 |
| 3,332,446 | 7/1967 | Mann | 138/114 |
| 3,473,575 | 10/1969 | Vagelsang | 138/114 X |
| 3,490,496 | 1/1970 | Stearns | 174/29 X |

FOREIGN PATENTS OR APPLICATIONS

| | | | |
|---|---|---|---|
| 470,528 | 1/1951 | Canada | 174/108 |
| 973,485 | 3/1960 | Germany | 174/105 |

*Primary Examiner*—Herbert F. Ross
*Attorney, Agent, or Firm*—Ralf H. Siegemund

[57] ABSTRACT

A corrugated metal tube has radially outwardly bulging corrugation crests which extend helically or circularly around the axis of the tube; a plurality of tensioned, metal strips, are helically wound on and engaging the crests at similar relatively large pitch angles, preferably in the range from 60° to 70°.

9 Claims, 2 Drawing Figures

PATENTED AUG 27 1974

3,831,636

INVENTOR:
HERBERT BITTNER

ATTORNEYS

ARMORED TUBING WITH HELICAL OR CIRCULAR CORRUGATION

The present invention relates to metal tubing having circular or helical corrugation as well as armoring, which is disposed helically on the tube. Electrical cables are often provided with a jacket made of corrugated tubing. The corrugated tubing is made in such a manner that longitudinally paid-in metal strip is shaped around the cable core to establish a split tube; the joint of the split tube is longitudinally seam-welded and the resulting tubing is subsequently corrugated. A corrugated jacket or tubular envelope for a cale remains quite flexible as it provides protection for the cable against water vapor; metal tubing is impermeable to moisture. Also, damage to the cable proper is avoided in that the corrugated tubing serves as a protective jacket. In a different field of art, it is known to employ corrugated tubing as conduit for fluids.

Corrugated tubing, however, has the disadvantage that for relatively high internal pressure there is a tendency for the tube to expand, particularly to expand in axial direction, i.e., to become longer. This is particularly so as the internal pressure tends to flatten and to remove the corrugation. The corrugation process shortens the initially made smooth wall tube, internal pressure tends to reverse that process.

It was found that very high internal pressure may actually completely smooth and flatten such corrugated tubing. Of course, if a given length of installed tubing suddenly becomes longer it may buckle and deflect laterally as a whole. In other words, the installed tubing may change locally its course. As that cannot be tolerated, the internal pressure applicable to such tubing is limited, and that in turn was found to be quite a drawback, particularly for high pressure cable. It has to be borne in mind, that insulation improves with pressure, and a particular cable can transmit a higher voltage for higher internal pressure.

It is an object of the present invention to provide corrugated tubing that is capable of withstanding very high internal pressure, without becoming longer and without lateral deflection as a consequence of such lengthening. In accordance with the preferred embodiment of the present invention, it is suggested to provide armoring for corrugated tubing by means of at least two metal tapes, strips or flat wires (collectively herein referred to as "strips"), which are helically wound around the tubing but at a large pitch angle for the helix so that the strips engage and run obliquely transverse across the outward bulging apeces or crests of the corrugation. In case of helical corrugation, the respective pitch angles should differ significantly. It is preferred in such a case, that the tube's corrugation helix has opposite sense of winding as the helices of the armoring strips. The pitch angle is determined in that the tangen's function of that angle is equal to the ratio of pitch length and circumferential perimeter of the corrugated tubing.

Strips disposed on the tubing at a large pitch angle impart a significant axial force upon the tube. As the corrugated tube itself tends to longitudinally expand under pressure, the individual loops of the armoring strips engage positively the crests of the corrugation and counteract this tendency of lengthening. It should be noted that it is known to armor a corrugated tube as it is used for a conduit for fluids, in that a strip is being wound on the tube at a relative small pitch angle. That kind of armoring increases the bursting pressure of such a tube. However, it simply was found that this type of armoring did not, hor hardly, reduce the tendency of overall tube lengthening. See for example German Patent No. 6,946,608.

In accordance with the invention, it was found that the pitch angle of the strip helix should be between 45° and 70°, preferably between 60° and 70°. In accordance with another feature of the present invention, it is suggested to provide the helical armoring onto the corrugated tubing under tension. Thus, slippage between the tube and the armoring is avoided. As stated, opposite pitch should be chosen in case the corrugation itself is helical. This way, it is avoided that for some reason or another the armoring strip may drop or slide into the corrugation valleys.

In order to prevent lateral sliding or relative shifting of the strips in relation to each other, it is of advantage to provide a corrugated tubular jacket on top of the armoring, whereby the inwardly oriented crest of that tube (which are the outwardly oriented valleys thereof), engage the armoring strips and hold them down. This jacket is made in the same way as the principle tubing, in that a longitudinally paid flat strip is formed into a split tube, seam welded at the joint and corrugated subsequently.

It was found to be of particular advantage to use spring steel as trip material for the armoring. In order to permit an additional increase of pressure in the interior of the armored corrugated tubing, it is of advantage to provide plural strip layers of armoring; preferably with different or differently oriented pitch of the several layers. Another refinement of the invention is to be seen in that foils of plastic are interposed between tube and armoring, and also in between several layers of armoring if they are provided. The plastic foil prevents contact corrosion of the material. This precaution is particularly important in case, for example, the tubing to be armored is made of copper and, as mentioned above, spring steel is used as armoring. In accordance with another feature, there are preferably many armoring strips used so that actually the entire surface, or almost the entire surface, of the corrugated tube is covered by the armoring.

Figure 2:
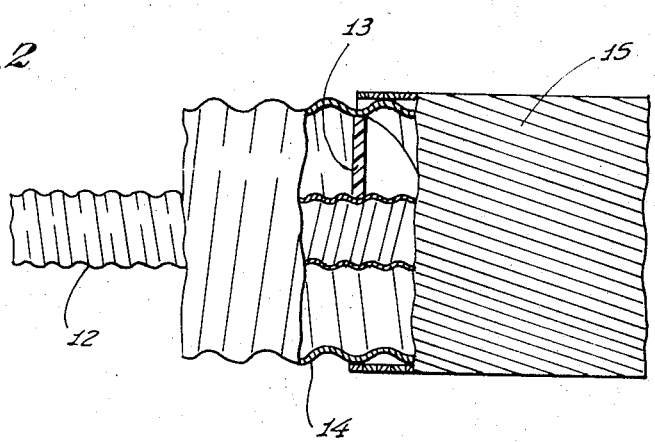

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates side elevation, in partial cross-section, of a high voltage cable armored in accordance with and as an example of the preferred embodiment of the present invention; and FIG. 2 illustrates longitudinal section view through a high-frequency cable armored in accordance with another example of the preferred embodiment of the present invention.

Proceeding now to the detailed description of the drawings, in FIG. 1 thereof is illustrated three paper or plastic insulated conductor cores 1, 2 and 3. These conductors are disposed in the interior of a corrugated tubing 4. In order to improve the electrical insulation, the interior space 5 of tubing 4 is filled with a gas, for example, sulfur hexafluoride, $SF_6$. That gas is maintained under pressure. Clearly, the higher the pressure is the better is the insulation of the cable, and the voltage that can be conducted through the cable can be higher accordingly. Therefore, the capability of withstanding an increase in psressure is clearly of advantage. For this, it is necessary to armor the tube.

The armoring is provided by plural flat wires or strips 6, preferably made of spring steel and having width narrower than the corrugation wavelength as can be seen readily from the drawing; there are many of these strips helically wrapped around the tube 4 at a rather large pitch angle. The pitch angle is preferably between 60° and 70° as outlined above. In particular, the individual strips have been helically wrapped around the tubing 4 under tension; these run parallel to each other and cover the surface of the tubing almost completely.

Reference numeral 9 denotes a plastic foil that is interposed between tube 4 and the armoring strips. However, the plastic foil 9 does not itself serve as a carrier. The strips 6 as helically wound on the tube 4 are in fact supported by crests of the corrugation. One can also see from FIG. 1 that the sense of winding of the helical corrugation of tube 4 is directed opposite to the sense of winding of the armoring strips 6 as they have been wound onto the tube 4.

In order to improve this armoring further, a second layer is provided, likewise constituted by plural strips, that are wound onto armoring strips 6. The pitch of the respective helices has opposite sense of winding. Also, a plastic foil 10 is interposed between he two layers of strips 6 and 7, and strips 7 are also laid under tension.

The layer of strips 7 is covered with a plastic foil 11, and on top a jacket 8 is provided in form of a helically corrugated metal tube. The valleys of the corrugation of tubing 8, i.e., the inwardly bulging tube portions positively engage strips 7 (through the foil 11) so as to posiiton the armoring strips throughout the length of the tubing.

Tubing armored in accordance with the teaching of this invention has been constructed. Such tubing was then tested, and it was found that the strips armored tubing could withstand pressure up to 213 atmospheres maximum. At that pressure, no more than one-tenth of 1 percent lengthening of the tubing was observed. The same type of tube (4), but without armoring, exhibited already lengthening by three-tenths of 1 percent at 6 atmospheres pressure. THe lengthening increased to a full one percent at 13 atmospheres, and at 45 atmospheres the unarmored tube burst.

Another interesting experiment involved variation of the pitch angle. Similar to that described, tubing was made with similar type armoring but at a smaller pitch angle; the bursting pressure was reduced here to about 110 atmospheres and just below bursting the lengthening was about 2 percent. Of course, this is an improvement over an unarmored tube, but it can readily be seen that by increasing the pitch angle of the armoring strips, considerably improvement in pressure can be obtained.

The amazing characteristics of a tube when armored in accordance with the teaching of this invention can be explained in that the individual flat wires or strips when wound at a large pitch angle onto the tube, do in fact grip the tube more positively and prevent its axial extension by counteracting its tendency to lengthen; strips wound at a smaller pitch angle will not prevent expansion bellows-like corrugation to the same degree.

Another example for practicing the preferred embodiment of the present invention is shown in FIG. 2. In particular, there is shown a high-frequency cable having a corrugated, tubular, inner conductor 12. A spacer 13, for example, a helical spacer, is wound onto and disposed on the inner conductor 12 and supports an outer conductor 14, which is likewise a corrugated tube or larger diameter. Such high-frequency cables are operated with advantage if the pressure of a protective gas in the space between two conductors 12 and 14 is rather high; also, insulative and thermal properties of the high-frequency cable improves with higher pressure.

In order to permit development of a relatively high pressure, in the tube an armoring 15 is provided with the outer conductor 14 and, in a manner similar to the one explained above. Plural steel strips are wound helically and at a large pitch angle onto the outer tube 14 and again it may be of advantage to interpose a plastic foil between the strips and the tube 14. As pressurized gas sulphur hexafluoride is preferably used, however, air or pure nirtogen is likewise suitable.

The invention is not limited to the embodiments described above but all changes and modifications thereof not constituting departures from the spirit and scope of the invention are intended to be included.

I claim:

1. A corrugated, metal tube with a longitudinal welding seam and radially outwardly bulging corrugation crests, extending helically or circularly around the axis of the tube and having certain wavelength, an armoring for the tube comprises of plurality of helical, flat metal strips, seated on and engaging the crests at similar relatively large pitch angles, the strips being flat wires and narrower than the corrugation wavelength and are being held under tension for positively gripping the tube's crests and disposed next to each other to cover the entire tube to prevent tube lengthening and local buckling in case of high internal pressure in the tube; and including an outer, corrugated envelope with inwardly bulging valleys, engaging the strips for maintaining them in position.

2. Tube as in claim 1, the pitch angle being in the range from 45° to 70°.

3. Tube as in claim 1, the pitch angle being in the range from 60° to 70°.

4. Tube with helical corrugation as in claim 1, the helix as defined by each strip having opposite sense of winding as the corrugation.

5. Tube as in claim 1, there being a plastic foil between the strips and the envelope.

6. Tube as in claim 1, the strips establishing plural armoring layers with different helical pitch angle for each layer.

7. Tube as in claim 1, there being a plastic foil in between respective two layers.

8. Tube as in claim 1, there being a plastic foil between the tube and the strips.

9. Tube as in claim 1, the strips made of spring steel.

* * * * *